May 21, 1963  M. WORMAN  3,090,451
DUSTLESS DRILL
Filed Dec. 20, 1960
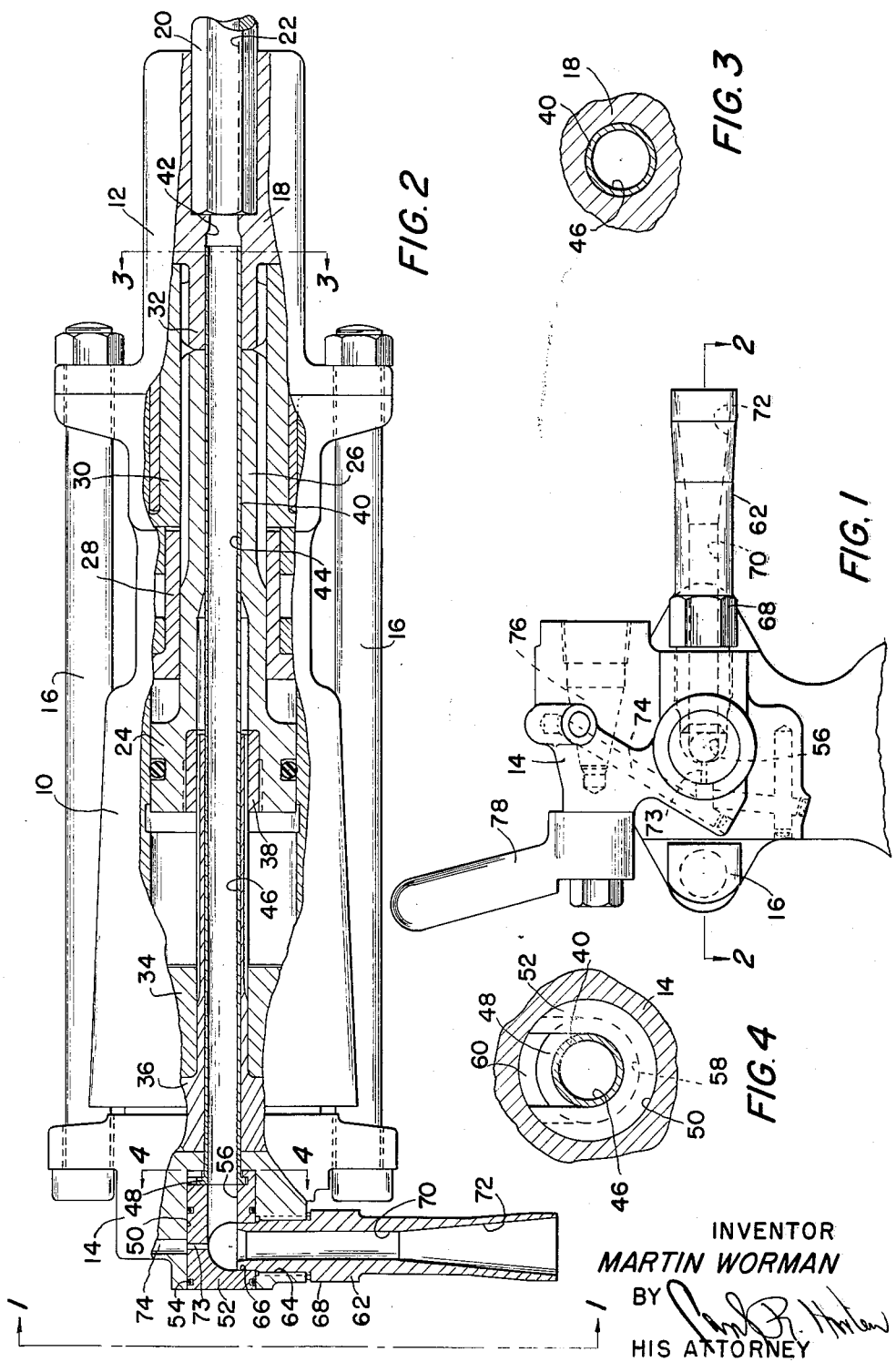
INVENTOR
MARTIN WORMAN
BY
HIS ATTORNEY

United States Patent Office 3,090,451
Patented May 21, 1963

3,090,451
DUSTLESS DRILL
Martin Worman, Phillipsburg, N.J., assignor to Ingersoll-Rand Company, New York, N.Y., a corporation of New Jersey
Filed Dec. 20, 1960, Ser. No. 77,143
7 Claims. (Cl. 175—213)

This invention relates to rock drills of the dustless type and dust collecting apparatus for such drills.

Rock drills of the so-called dustless type, which should be more properly called "dust controlling," are of various types. The particular type to which this invention relates is adapted to draw air down into the hole being drilled, which air is carried up through the center of the drill steel with entrained dust and thence through the rock drill, by way of a suitable tube, to a separating filter. This type of dust control is in many ways preferable to others because the air that carries the dust has no opportunity to escape until it is cleansed of the dust it carries. The velocity of the air conveying the dust through the drill is generally, and preferably, quite high; and since the dust is abrasive, the passages through which the dust passes wear badly and must be periodically replaced. Such replacement has heretofore been of a sort requiring that the drill be taken to a repair shop which generally means that the drill is out of operation for a considerable time.

It is an object of this invention to provide a drill of this character permitting replacement of worn tubes or parts with the use of simple and few tools and requiring a minimum of skill so that the operator can quickly perform the operation.

Other objects will be in part obvious and in part pointed out hereinafter.

The drawing illustrates a preferred embodiment of the invention and includes:

FIGURE 1, an end view of a rock drill looking in the direction of the arrows 1—1 as indicated in FIG. 2, FIG. 2 is a view in elevation of the rock drill with components thereof broken away substantially along line 2—2 of FIG. 1 looking in the direction of the arrows to show the interior drill construction, FIG. 3 is a cross section taken along the line 3—3 of FIG. 2 looking in the direction of the arrows, and FIG. 4 is a transverse section at the line 4—4 of FIG. 2 looking in the direction of the arrows.

Referring to the drawing, the rock drill to which this invention relates has a drill cylinder 10 with a front head 12 and a backhead 14 held together by side bolts 16. The front head is provided with a chuck 18 for receiving a hollow drill steel 20 of which the central hole 22 is adapted to convey dust laden air from a source of dust at the bottom of the drill hole (not shown). Within cylinder 10 is provided a motive element for actuating drill steel 20, in this case a reciprocating piston 24 having a nose 26 guided by front cylinder washer 28 within cylinder 10 and fluted to engage a correspondingly fluted rotation sleeve 30 engaging the fluted end 32 of chuck 18. As will be well understood by those skilled in the art, hammer piston 24 is caused to reciprocate through the medium of compressed air controlled by a suitable valve (not shown) which may be housed in the valve chamber 34, and rotation of the piston 24 is accomplished by means of a suitable rifle bar 36 cooperating with the rifle nut 38 in the head of piston 24. These details of construction are not enlarged upon in this description since their operation is well understood by those skilled in the art.

In accordance with the practice of this invention, dust is removed via the central hole 22 of drill steel 20 by a tube 40 extending longitudinally of the drill and communicating by way of an aperture 42 in chuck 18 at the mouth of hole 22. Tube 40 fits rather closely in hole 42 to avoid any substantial leakage along the outside of the tube. Likewise, very little clearance is provided between tube 40 and a central bore 44 in piston 24 as well as the longitudinal bore 46 in rifle bar 36.

At its rear end tube 40 terminates in a lateral projection, in this case a flange 48, lying within a bore 50 in backhead 14 coaxial with tube 40. Flange 48 of tube 40 is gripped and held in position by a plug member 52 fitting into bore 50 and sealed by O-rings 54 carried by the plug member 52. The manner of attaching flange 48 to plug 52 is shown in detail in FIG. 4. For this purpose, plug 52 is provided with a hole 56 in alignment with the hole of tube 40 and near its end is undercut to form a slot 58 opening at the side to form an entering passage 60 from the side for the flange 48. Thus, when plug 52 is out of bore 50, it can be hooked onto the end flange 48 of tube 40 by sliding that flange into the slot 58 and thereafter inserted into bore 50. Tube 40 is locked thus into plug 52 and cannot move longitudinally either forward or backward. With such an attachment, no tools are needed, nor skill.

Plug 52 is held in bore 50 by an ejector member 62 which passes through a threaded bore 64 transverse to hole 56 in backhead 14 and into a hole 66 bored in the side of plug 52 and communicating with hole 56. Thus, when ejector member 62 is unscrewed so that its end clears hole 66, plug 52 is free to be withdrawn with tube 40 attached. Upon replacement of plug 52, it is held in position by merely screwing ejector 62 back into hole 66.

For this purpose, ejector 62 can be provided with a gripping surface either milled for engagement with a pair of pliers or with flats 68 for engagement by a wrench.

Ejector 62 may be in the form of a Venturi tube with a throat 70 and a diffuser end 72 at which a suitable tube can be attached for carrying the dust to a suitable filter (not shown). To actuate the ejector 62, plug 52 is provided with an injector nozzle 73 coaxial with the throat 70 and communicating by way of a passageway 74 in backhead 14 with the main control valve 76 of the rock drill.

Thus, by turning the control handle or throttle handle 78, valve 76 is adapted to admit air under pressure, through passageway 74, to the injector nozzle 73 which injects air at high velocity into the throat 70 of ejector 62, causing suction in hole 56 and the interior of tube 40 to draw dust laden air into the ejector whence it is suitably disposed of by filtering or otherwise cleansing the air.

As has been said above, the passage of dust laden air to the interior of tube 40 requires frequent replacement of that tube and for this purpose the drill runner may carry with him replacement tubes. This is a simple matter inasmuch as all he need do is to unscrew ejector 62 a short way, and having removed drill steel 20, the tube 40 and plug 52 may be moved backward from the front end far enough to enable him to grip plug 52 and to thus pull out tube 40, replace it part way, hook plug 52 onto the flange 48 of the new tube, push it back into place and screw back ejector 62 with his wrench. This can be performed without so much as disconnecting the main air supply from the drill. Obviously, the time the drill is required to be out of service is substantially negligible.

Thus, by the above construction are accomplished, among others, the objects hereinbefore referred to.

I claim:

1. In a fluid operated percussive rock drill adapted to receive one end of a drill steel which has a bore communicating with the interior of a hole being drilled, an assembly for removing drill cuttings by suction comprising, a tube in said rock drill communicating with the bore in said drill steel to receive drill cuttings from the latter, a member having a passageway extending partly therethrough slidably receivable in and removable from the rock drill, said member being adapted to engage said tube to prevent movement of said tube relative to said member and communicate said tube with the passageway in said member, an ejector connected to said rock drill with the longitudinal axis of the ejector extending at an angle with respect to the longitudinal axes of the member and tube so as to communicate with the passageway in said member and engage said member to prevent slidable movement of said member from the rock drill until said ejector is at least partially disconnected from the rock drill, and means communicating said ejector with a source of pressurized fluid to provide for flow of fluid therethrough and induce fluid flow through the bore in the drill steel, the tube, and the passageway in said member.

2. In a fluid operated percussive rock drill having a rear end portion and a forward end portion adapted to receive one end of a drill steel which has a bore communicating at one end with the interior of a hole being drilled, an assembly for removing drill cuttings by suction comprising, a tube disposed to extend substantially from the forward end portion to the rear end portion of the rock drill and communicating with the bore of said drill steel, a member having a passageway extending partly therethrough, said member being slidably receivable in and removable from the rear end portion of the rock drill and adapted to engage said tube to prevent movement of said tube in a direction toward said rear end portion, said passageway in said member communicating at one end with said tube, and an ejector adapted to receive therethrough pressurized fluid and secured in said rear end portion of the rock drill with the longitudinal axis of the ejector extending at an angle with respect to the longitudinal axes of the member and tube so that the ejector extends into the end of said passageway opposite from said tube to prevent slidable movement of said member from said rear end portion of the rock drill.

3. In a fluid operated percussive rock drill having a rear end portion and a forward end portion adapted to receive one end of a drill steel which has a bore communicating with the interior of the hole being drilled, an assembly for removing drill cuttings by suction comprising, a tube disposed to extend substantially from the forward end portion to the rear end portion of the rock drill and communicating with the bore of said drill steel, a member having a passageway extending coaxially therein from one end thereof and thence at an angle to terminate at the periphery of the member, said member slidably receivable in and removable from the rear end portion of the rock drill and adapted to engage said tube to restrict movement of said tube in a direction toward said rear end portion, said passageway in said member being in communication with said tube at said one end of the member, and an ejector adapted to receive pressurized fluid therethrough, said ejector being connected by axial movement thereof at an angle with respect to the longitudinal axes of said member and tube into the rear end portion of the rock drill so as to communicate with the passageway where the latter terminates in the periphery of said member and engage said member to prevent slidable movement of said member from said rear end portion until said ejector is disconnected by at least partial axial movement thereof from said rear end portion of the rock drill.

4. In a fluid operated percussive rock drill having a rear end portion and a forward end portion adapted to receive one end of a drill steel which has a bore communicating with the interior of the hole being drilled, an assembly for removing drill cuttings by suction comprising, a tube slidably receivable in said rock drill and disposed to extend substantially from the forward end portion to the rear end portion of the rock drill, said tube being in communication with the bore of the drill steel to receive drill cuttings from said bore, said tube being provided adjacent its rear end with projecting means, a member having a passageway extending coaxially from one end thereof to a point short of the opposite end of the member and thence normal to the longitudinal axis of said member, said member having means for engaging said projecting means to prevent endwise movement of said tube relative to said member and register said tube with the passageway at said one end of said member, said member and said tube being slidably receivable in and removable from said rear end portion of the rock drill, an ejector connected in the rear end portion of the rock drill with the longitudinal axis of the ejector extending normal to the axis of said member so as to communicate with the passageway in said member and engage said member to prevent slidable movement of said member from the rear end portion of the rock drill until said ejector is partially disconnected from said rear end portion of the rock drill, and means for communicating said ejector with a source of pressurized fluid so that flow therethrough induces fluid flow through the bore of the drill steel, the tube, and the passageway in said member.

5. In a fluid operated percussive rock drill having a rear end portion and a forward end portion adapted to receive one end of a drill steel which has a bore communicating with the interior of a hole being drilled, an assembly for removing drill cuttings by suction comprising, a tube slidably receivable in said rock drill and disposed to extend substantially from the forward end portion to the rear end portion of the rock drill, said tube being in communication with the bore of the drill steel to receive drill cuttings from said bore, said tube having its rear end flanged, a member having a passageway extending from one end thereof and terminating at the periphery of the member, said member having a slot constructed at the said one end of said member to receive the flanged end of said tube to prevent endwise movement of said tube relative to said member and register the interior of said tube with the passageway of said member, said member and said tube being slidably receivable in and removable from the rear end portion of the rock drill, an ejector connected in the rear end portion of the rock drill so as to communicate with the passageway in said member and engage said member at the peripheral termination of said passageway to prevent slidable movement of said member from the rear end portion of the rock drill until at least partial disconnection of said ejector from said rear end portion, and means for communicating said ejector with a source of pressurized fluid so that flow therethrough induces fluid flow through the bore of the drill steel, the tube, and the passageway in said member.

6. In a fluid operated percussive rock drill having a rear end portion and a forward end portion adapted to receive one end of a drill steel which has a bore communicating with the interior of a hole being drilled, an assembly for removing drill cuttings by suction comprising, an axial opening extending through said rock drill from the forward end portion to the rear end portion of the rock drill, said opening having a counterbored portion in the rear end portion of the rock drill, a tube having a flange at one end thereof, said tube being slidably receivable in said opening and dimensioned to extend from the forward end portion with the flange thereof positioned in the counterbored portion of said opening, a cylindrical member having a coaxial passageway extending from one end thereof and terminating at the peripheral surface of the member, said member having a slot in said one end thereof adapted to receive the flange of said tube to prevent axial movement of said tube relative to said member and register the tube with the passageway in said member, said member being slidably receivable in said counterbored portion and in sealing relation to the counterbored portion, an ejector having a venturi shaped bore connected the rear end portion of the rock drill with the venturi shaped bore communicating with the passageway in said cylindrical member, said ejector being in engagement with the cylindrical member at the peripheral termination point of said passageway to restrain the cylindrical member from movement out of said counterbored portion until at least partial disconnection of the ejector from the rear end portion of said rock drill, and passage means for communicating the venturi shaped bore with a source of fluid under pressure to provide for induced flow of fluid and entrained drill cuttings through said bore in the drill steel, the tube, and the passageway in said cylindrical member.

7. In a fluid operated percussive rock drill having a backhead and a fronthead adapted to receive one end of a drill steel which has a bore communicating with the interior of a hole being drilled, an assembly for removing drill cuttings by suction comprising, an axial opening extending through said rock drill from the fronthead to the backhead, said opening having a counterbored portion in said backhead, a tube having a flanged end portion slidably receivable in said opening in close spaced relationship with at least part of said opening, said tube dimensioned in length to extend from the fronthead to the counterbored portion of said opening with the flanged end portion adjacent the bottom of said counterbored portion, a cylindrical member having a passageway extending from one end thereof to a point short of the opposite end and thence laterally through the peripheral surface of the member, a slot in said cylindrical member adapted to receive the flanged end portion of said tube to prevent axial movement of the tube relative to said member and register the interior of said tube with the passageway at said one end of the member, said member being slidably receivable in the counterbored portion of the opening and in sealing relationship with the surface of the counterbored portion, an ejector secured at one end in the backhead by axial movement of said ejector so as to extend into the said laterally extending portion of the passageway in said member to thereby prevent movement of said member from the counterbored portion of the opening until said ejector is axially moved at least sufficiently to withdraw said ejector from the laterally extending portion of the passageway in said member, and means in said member communicating with a source of pressurized fluid to deliver pressurized fluid coaxially into said ejector so as to induce fluid flow through the bore in said drill steel, tube, and the passageway in said member.

References Cited in the file of this patent

UNITED STATES PATENTS

| | | |
|---|---|---|
| 1,084,152 | Kessel | Jan. 13, 1914 |
| 1,087,632 | Benjamin | Jan. 17, 1914 |
| 2,019,332 | Atkins | Oct. 29, 1935 |
| 2,738,769 | Holman et al. | Mar. 20, 1956 |
| 2,839,273 | Holman et al. | June 17, 1958 |
| 2,919,901 | Sandvig | Jan. 5, 1960 |